US010998634B2

(12) United States Patent
Lee et al.

(10) Patent No.: US 10,998,634 B2
(45) Date of Patent: May 4, 2021

(54) ELECTRONIC DEVICE INCLUDING ANTENNA APPARATUS USING PHOTO-CONDUCTIVE MATERIAL AND ANTENNA CONTROL METHOD

(71) Applicant: Samsung Electronics Co., Ltd., Suwon-si (KR)

(72) Inventors: Jongin Lee, Suwon-si (KR); Dongil Yang, Suwon-si (KR); Kihyug Seong, Suwon-si (KR); Hyoseok Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/659,019

(22) Filed: Oct. 21, 2019

(65) Prior Publication Data
US 2020/0127382 A1 Apr. 23, 2020

(30) Foreign Application Priority Data

Oct. 19, 2018 (KR) .......................... 10-2018-0125248

(51) Int. Cl.
*H01Q 9/14* (2006.01)
*H01Q 1/24* (2006.01)
*H04M 1/02* (2006.01)

(52) U.S. Cl.
CPC ............. *H01Q 9/145* (2013.01); *H01Q 1/243* (2013.01); *H04M 1/0202* (2013.01); *H04M 2250/12* (2013.01)

(58) Field of Classification Search
CPC ..... H01Q 9/145; H01Q 1/243; H04M 1/0202; H04M 2250/12
(Continued)

(56) References Cited

U.S. PATENT DOCUMENTS 6,417,807 B1 * 7/2002 Hsu .......................... H01Q 1/38
333/262
6,762,662 B2 7/2004 Lee et al.
(Continued)

FOREIGN PATENT DOCUMENTS

JP         5096271 B2      12/2012
KR   10-2016-0001049 A     1/2016
(Continued)

OTHER PUBLICATIONS

Kusumawati et al., Design and Fabrication of Low-cost Reconfigurable microstrip antenna using photodiode as optical switching, AIP Conference Proceedings, Feb. 17, 2015, pp. 67-70. (Year: 2015).*
(Continued)

*Primary Examiner* — Yuwen Pan
*Assistant Examiner* — Angelica M Perez
(74) *Attorney, Agent, or Firm* — Jefferson IP Law, LLP

(57) ABSTRACT

An electronic device is provided. The electronic device includes a housing including a first plate facing a front of the electronic device, a second plate facing away from the first plate, and a side bezel structure surrounding a space between the first plate and the second plate, and a printed circuit board disposed at least at a portion of the space and including at least one processor, an antenna module, and at least one light source controlled by the at least one processor, wherein the side bezel structure may include at least two segmented antenna apparatuses and at least one photo-conductive material disposed between the segmented antenna apparatuses, and wherein the printed circuit board may include the at least one light source separated by a preset distance from the at least one photo-conductive material in a direction corresponding to the at least one photo-conductive material.

20 Claims, 13 Drawing Sheets

(58) Field of Classification Search
USPC .............................................. 455/41.1–41.3
See application file for complete search history.

(56) References Cited

U.S. PATENT DOCUMENTS

| | | | |
|---|---|---|---|
| 7,082,230 | B2 | 7/2006 | Huang et al. |
| 7,157,989 | B2 | 1/2007 | Kim et al. |
| 7,292,125 | B2 | 11/2007 | Mansour et al. |
| 8,299,861 | B2 | 10/2012 | Tatoian et al. |
| 10,003,131 | B2 | 6/2018 | Miller, II |
| 2007/0180338 | A1 | 8/2007 | Becker et al. |
| 2010/0134372 | A1 | 6/2010 | Ryu et al. |
| 2010/0285759 | A1* | 11/2010 | Chung .................. H01Q 1/243 |
| | | | 455/101 |
| 2012/0009983 | A1 | 1/2012 | Mow et al. |
| 2013/0135157 | A1 | 5/2013 | Tsou et al. |
| 2017/0179580 | A1 | 6/2017 | Park et al. |
| 2018/0102586 | A1 | 4/2018 | Shin et al. |
| 2018/0143331 | A1* | 5/2018 | Maeda .................. G01T 1/2018 |
| 2018/0287248 | A1 | 10/2018 | Han et al. |
| 2019/0235671 | A1* | 8/2019 | Lazzi ....................... G06F 1/16 |
| 2019/0363457 | A1* | 11/2019 | Chen ..................... H01Q 21/29 |

FOREIGN PATENT DOCUMENTS

| | | |
|---|---|---|
| KR | 10-2017-0074664 A | 6/2017 |
| WO | 2007/086966 A1 | 8/2007 |

OTHER PUBLICATIONS

International Search Report and Written Opinion dated Jan. 23, 2020, issued in International Application No. PCT/KR2019/013677.
European Search Report dated Mar. 12, 2020, issued in European Application No. 19203789.3-1205.

* cited by examiner

ELECTRONIC DEVICE INCLUDING ANTENNA APPARATUS USING PHOTO-CONDUCTIVE MATERIAL AND ANTENNA CONTROL METHOD

CROSS-REFERENCE TO RELATED APPLICATION(S)

This application is based on and claims priority under 35 U.S.C. § 119(a) of a Korean patent application number 10-2018-0125248, filed on Oct. 19, 2018, in the Korean Intellectual Property Office, the disclosure of which is incorporated by reference herein in its entirety.

BACKGROUND

1. Field

The disclosure relates to an electronic device including an antenna apparatus using a photo-conductive material and to an antenna control method.

2. Description of Related Art

The number of electronic devices supporting wireless communication is increasing. To meet the increasing demand for wireless data traffic after the commercialization of 4th generation (4G) communication systems, next generation communication systems including 5th generation (5G) communication systems and WiGig communication systems are being developed. Electronic devices can support various communication systems.

Meanwhile, in such an electronic device, the antenna may constitute a part of the housing of the electronic device. When the antenna is configured as a part of the housing of the electronic device, the antenna length that can be implemented according to communication frequency bands can be limited.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an antenna apparatus using a photo-conductive material and an electronic device including the antenna apparatus wherein the electrical length of the antenna can be changed by altering the electrical state of the photo-conductive material according to communication frequency bands.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first plate facing a front of the electronic device, a second plate facing away from the first plate, and a side bezel structure surrounding a space between the first plate and the second plate, and a printed circuit board (PCB) disposed at least a portion of the space and including at least one processor, an antenna module, and at least one light source controlled by the at least one processor, wherein the side bezel structure may include at least two segmented antenna apparatuses and at least one photo-conductive material disposed between the segmented antenna apparatuses, and wherein the printed circuit board may include the at least one light source separated by a preset distance from the at least one photo-conductive material in a direction corresponding to the at least one photo-conductive material.

In accordance with another aspect of the disclosure, an electronic device is provided. The electronic device includes a light emitting element, an antenna structure including a first conductive member having a first antenna length, a second conductive member having a second antenna length, and a photo-conductive member disposed between the first conductive member and the second conductive member, and configured to constitute at least a portion of the outer surface of the electronic device, a communication circuit electrically connected to the first conductive member and the second conductive member, and at least one processor, wherein the at least one processor may be configured to communicate with, while light is not output from the light emitting element, an external electronic device via the communication circuit through a first frequency band corresponding to the first antenna length or a second frequency band corresponding to the second antenna length, control the light emitting element to emit light to the photo-conductive member, and communicate with, when the first conductive member and the second conductive member are electrically connected to each other through the photo-conductive member irradiated by light so as to have a third antenna length, while light is output from the light emitting element, an external electronic device via the communication circuit through a third frequency band corresponding to the third antenna length.

In accordance with another aspect of the disclosure, an electronic device is provided. The electronic device includes a light emitting element, a first conductive member having a first antenna length, a second conductive member having a second antenna length, a photo-conductive member disposed between the first conductive member and the second conductive member, and a control circuit, wherein the control circuit may be configured to control the light emitting element to emit light to the photo-conductive member, and electrically connect the first conductive member and the second conductive member through the photo-conductive member irradiated by light so as to have a third antenna length.

In accordance with another aspect of the disclosure, an electronic device is provided. The electronic device includes an antenna apparatus using a photo-conductive material and the antenna control method may change the electrical length of the antenna by altering the electrical state of the photo-conductive material according to the communication frequency band, securing the antenna performance for various communication frequencies.

In accordance with another aspect of the disclosure, an electronic device is provided. The electronic device includes an antenna apparatus using a photo-conductive material and the antenna control method may change the electrical length of the antenna by changing the electrical state of the photo-conductive material according to the communication frequency band, improving the antenna performance without altering the external appearance of the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
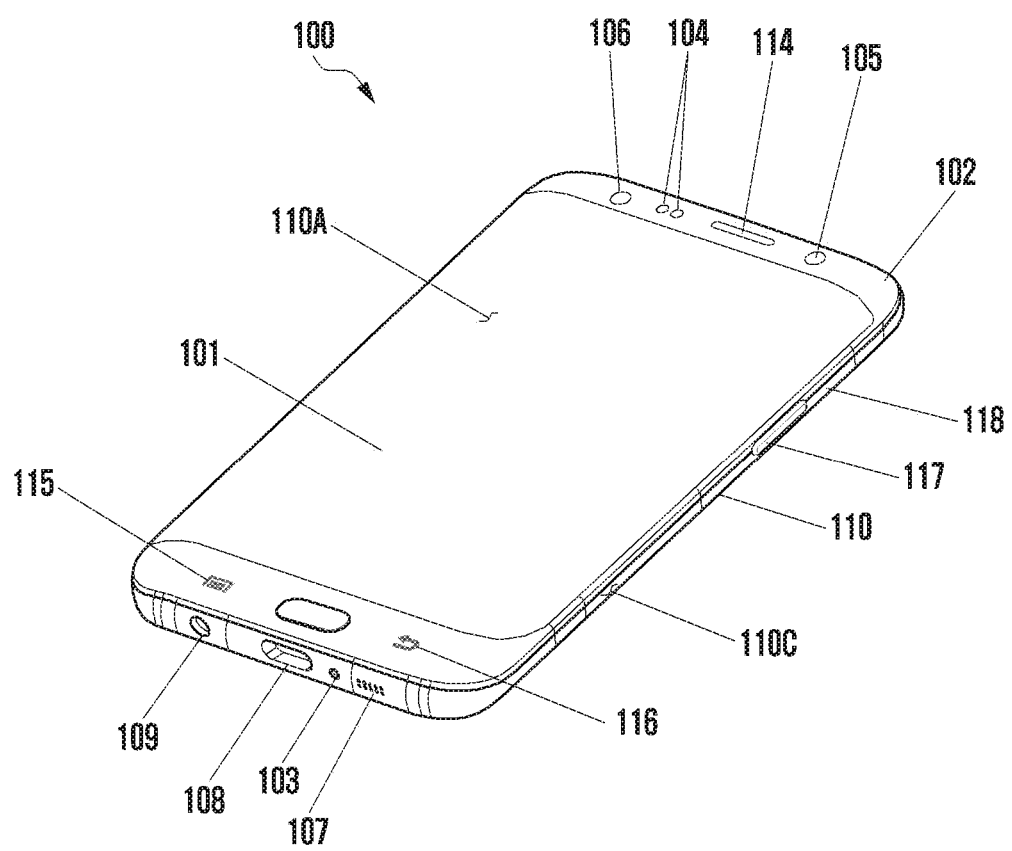
FIG. 1 is a front perspective view of a mobile electronic device according to an embodiment of the disclosure.
Figure 2:
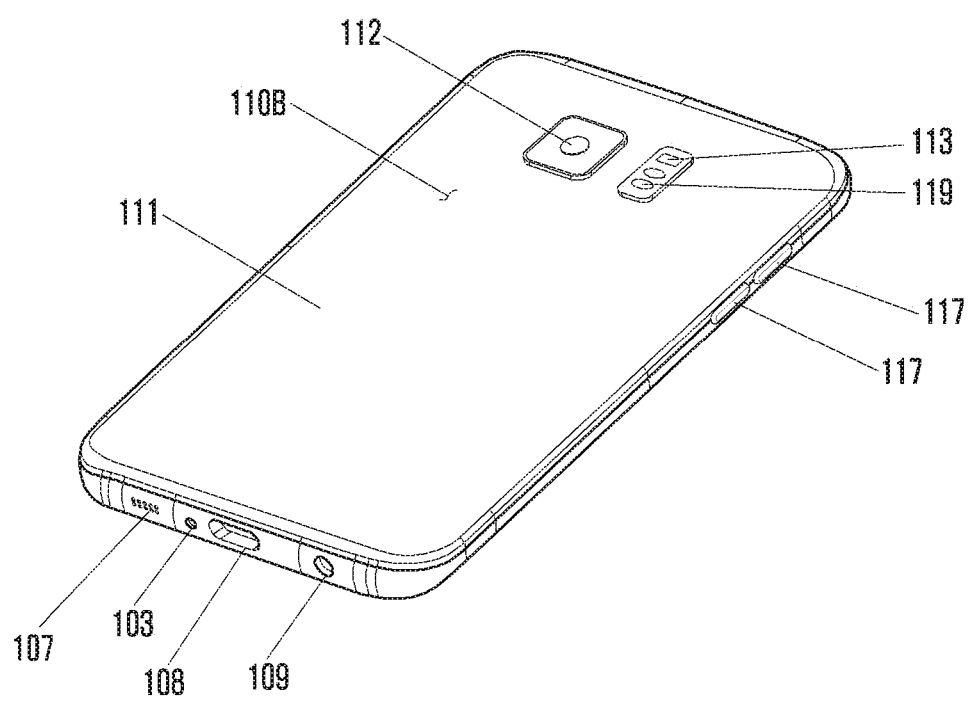
FIG. 2 is a rear perspective view of the electronic device in FIG. 1 according to an embodiment of the disclosure.
Figure 3:
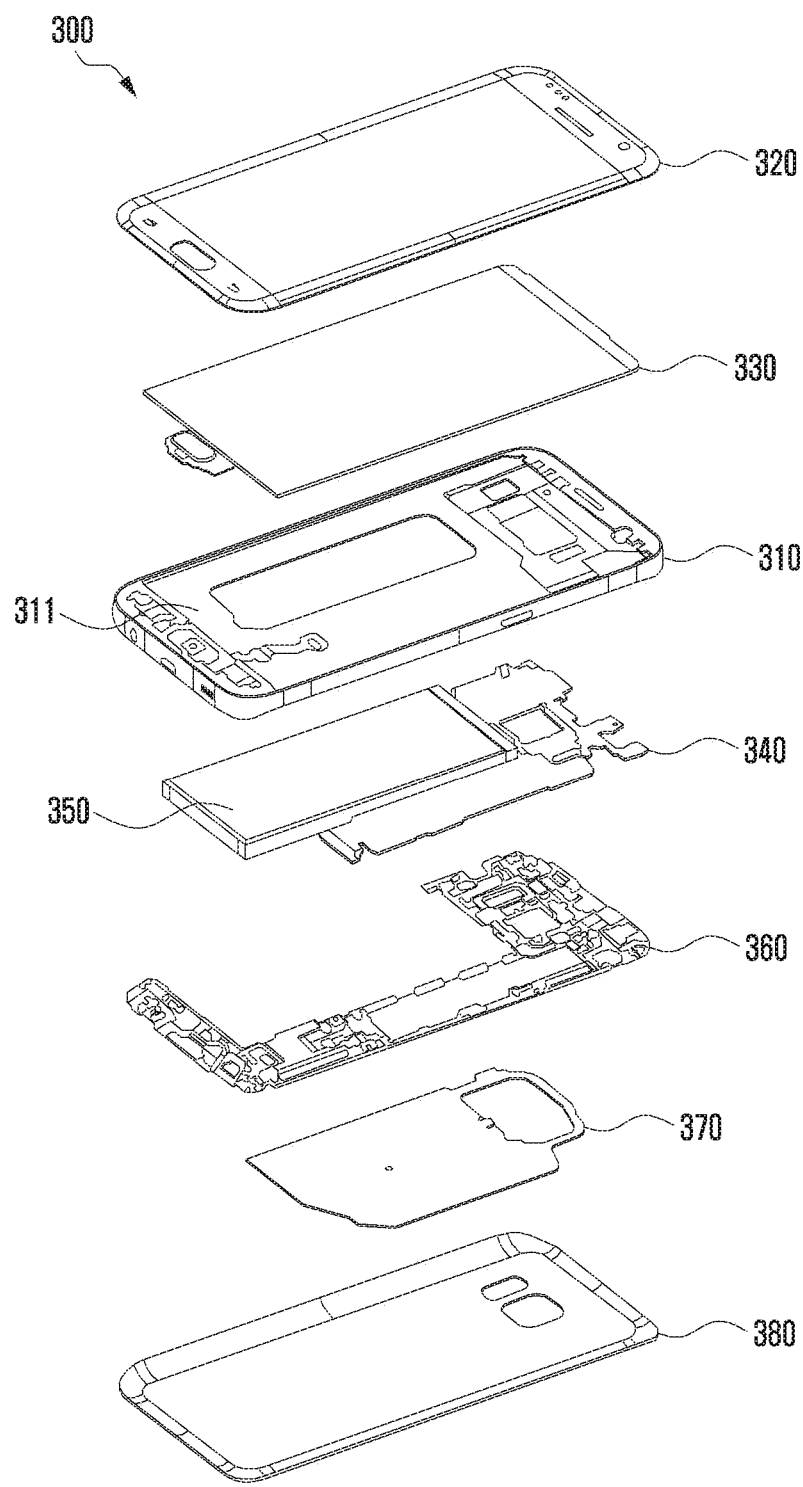
FIG. 3 is an exploded perspective view of the electronic device in FIG. 1 according to an embodiment of the disclosure.

FIG. 1 is a front perspective view of a mobile electronic device according to an embodiment of the disclosure. FIG. 2 is a rear perspective view of the electronic device of FIG. 1 according to an embodiment of the disclosure. FIG. 3 is an exploded perspective view of the electronic device of FIG. 1 according to an embodiment of the disclosure.

Referring to FIG. 1 and FIG. 2, an electronic device 100 may include a housing 110 including a first surface (or front surface) 110A, a second surface (or rear surface) 110B, and a side surface 110C surrounding the space between the first surface 110A and the second surface 110B. In another embodiment (not illustrated), the housing may denote a structure that forms a part of the first surface 110A, the second surface 110B, and the side surface 110C illustrated in FIG. 1. According to an embodiment, the first surface 110A may be formed by a front plate 102, at least a part of which is substantially transparent (for example, a glass plate including various coating layers, or a polymer plate). The second surface 110B may be formed by a rear plate 111 that is substantially opaque. The rear plate 111 may be made of coated or colored glass, ceramic, polymer, metal (for example, aluminum, stainless steel (STS), or magnesium), or a combination of at least two of the above-mentioned materials. The side surface 110C may be formed by a side bezel structure (or "side member") 118 which is coupled to the front plate 102 and to the rear plate 111, and which includes metal and/or polymer. In some embodiments, the rear plate 111 and the side bezel structure 118 may be formed integrally and may include the same material (for example, a metal material such as aluminum).

According to an embodiment, the electronic device 100 may include at least one of a display 101, audio modules 103, 107, and 114, sensor modules 104, and 119, camera modules 105, 112, and 113, a key input device 115, 116, 117, an indicator 106, and connector holes 108 and 109. In some embodiments, at least one of the constituent elements (for example, the key input device 115, 116, 117 or the indicator 106) of the electronic device 100 may be omitted, or the electronic device 100 may additionally include another constituent element.

The display 101 may be exposed through a corresponding part of the front plate 102, for example. In some embodiments, at least a part of the display 101 may be exposed through the front plate 102 that forms a first area of the side surface 110C and the first surface 110A. In another embodiment (not illustrated), the display 101 may be coupled to or arranged adjacent to a touch sensing circuit, a pressure sensor capable of measuring the intensity (pressure) of a touch, and/or a digitizer that detects a magnetic field-type stylus pen.

The audio modules 103, 107, and 114 may include a microphone hole 103 and speaker holes 107 and 114. A microphone for acquiring an external sound may be arranged in the microphone hole 103, and a plurality of microphones may be arranged therein such that the direction of a sound can be sensed in some embodiments. The speaker holes 107 and 114 may include an output speaker hole 107 and a speech receiver hole 114. In some embodiments, the speaker holes 107 and 114 and the microphone hole 103 may be implemented as a single hole, or a speaker may be included (for example, a piezoelectric speaker) without the speaker holes 107 and 114.

The sensor modules 104 and 119 may generate an electric signal or a data value corresponding to the internal operating condition of the electronic device 100 or the external environment condition thereof. The sensor modules 104 and 119 may include, for example, a first sensor module 104 (for example, a proximity sensor) arranged on the first surface 110A of the housing 110, a second sensor module (not illustrated) (for example, a fingerprint sensor), a third sensor module 119 (for example, a heart rate monitor (HRM) sensor) arranged on the second surface 110B of the housing 110, and/or a fourth sensor module 116 (for example, a fingerprint sensor). The fingerprint sensor may be arranged not only on the first surface 110A (for example, a home key button 115) of the housing 110, but also on the second surface 110B thereof. The electronic device 100 may further include a sensor module not illustrated, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a luminance sensor 104.

The camera modules 105, 112, and 113 may include a first camera device 105 arranged on the first surface 110A of the electronic device 100, a second camera device 112 arranged on the second surface 110B thereof, and/or a flash 113. The camera devices 105 and 112 may include a single lens or a plurality of lenses, an image sensor, and/or an image signal processor. The flash 113 may include, for example, a light-emitting diode or a xenon lamp. In some embodiments, two or more lenses (an infrared camera, a wide-angle lens, and a telephoto lens) and image sensors may be arranged on a single surface of the electronic device 100.

The key input device 115, 116, 117 may include the home key button 115 arranged on the first plate 110a of the housing 110, a touch pad 116 disposed around the home key button 115, and/or the side key button 117 arranged on the side surface 110c of the housing 110. In another embodiment, the electronic device 100 may not include a part of the above-mentioned key input device 115, 116, 117 or the entire key input device 115, 116, 117, and the key input device 115, 116, 117 (not included) may be implemented in another type, such as a soft key, on the display 101. The indicator 106 may be arranged on the first surface 110A of the housing 110, for example. The indicator 106 may provide information regarding a condition of the electronic device 100 in a light type, for example. In another embodiment, the indicator 106 may provide a light source that interworks with an operation of the camera module 105, for example. The indicator 106 may include, for example, a light emitting diode (LED), an infrared LED (IR LED), a xenon lamp, or the like.

The connector holes 108 and 109 may include a first connector hole 108 capable of containing a connector (for example, a universal serial bus (USB) connector) for transmitting/receiving power and/or data to/from an external electronic device, and/or a second connector hole (for example, an earphone jack) 109 capable of containing a connector for transmitting/receiving an audio signal to/from the external electronic device.

Referring to FIG. 3, an electronic device 300 may include a side bezel structure 310, a first support member 311 (for example, a bracket), a front plate 320, a display 330, a printed circuit board 340, a battery 350, a second support member 360 (for example, a rear case), an antenna 370, and a rear plate 380. In some embodiments, at least one of the constituent elements (for example, the first support member 311 or the second support member 360) of the electronic device 300 may be omitted, or the electronic device 300 may further include another constituent element. At least one of the constituent elements of the electronic device 300 may be identical or similar to at least one of the constituent elements of the electronic device 100 of FIG. 1 or FIG. 2, and repeated descriptions thereof will be omitted herein.

The first support member 311 may be arranged inside the electronic device 300 and connected to the side bezel structure 310 or may be formed integrally with the side bezel structure 310. The first support member 311 may be made of a metal material and/or a nonmetal (for example, polymer) material, for example. The display 330 may be coupled to one surface of the first support member 311, and the printed circuit board 340 may be coupled to the other surface thereof. A processor, a memory, and/or an interface may be mounted on the printed circuit board 340. The processor may include, for example, one or more of a central processing device, an application processor, a graphic processing device, an image signal processor, a sensor hub processor, a communication processor, or the like.

The memory may include a volatile memory or a non-volatile memory, for example.

The interface may include, for example, a high definition multimedia interface (HDMI), a USB interface, a secure digital (SD) card interface, and/or an audio interface. The interface may connect the electronic device 300 with an external electronic device electrically or physically, for example, and may include a USB connector, an SD card/multi-media card (MMC) connector, or an audio connector.

The battery 350 is a device for supplying power to at least one constituent element of the electronic device 300, and may include a non-rechargeable primary cell, a rechargeable secondary cell, or a fuel cell, for example. At least a part of the battery 350 may be arranged on substantially the same plane with the printed circuit board 340, for example. The battery 350 may be arranged integrally inside the electronic device 300, or may be arranged such that the same can be attached to/detached from the electronic device 300.

The antenna 370 may be arranged between the rear plate 380 and the battery 350. The antenna 370 may include, for example, a near field communication (NFC) antenna, a wireless charging antenna, and/or a magnetic secure transmission (MST) antenna. The antenna 370 may conduct near-field communication with an external device or may wirelessly transmit/receive power necessary for charging, for example. In another embodiment, an antenna structure may be formed by a part or a combination of the side bezel structure 310 and/or the first support member 311.

Figure 4:
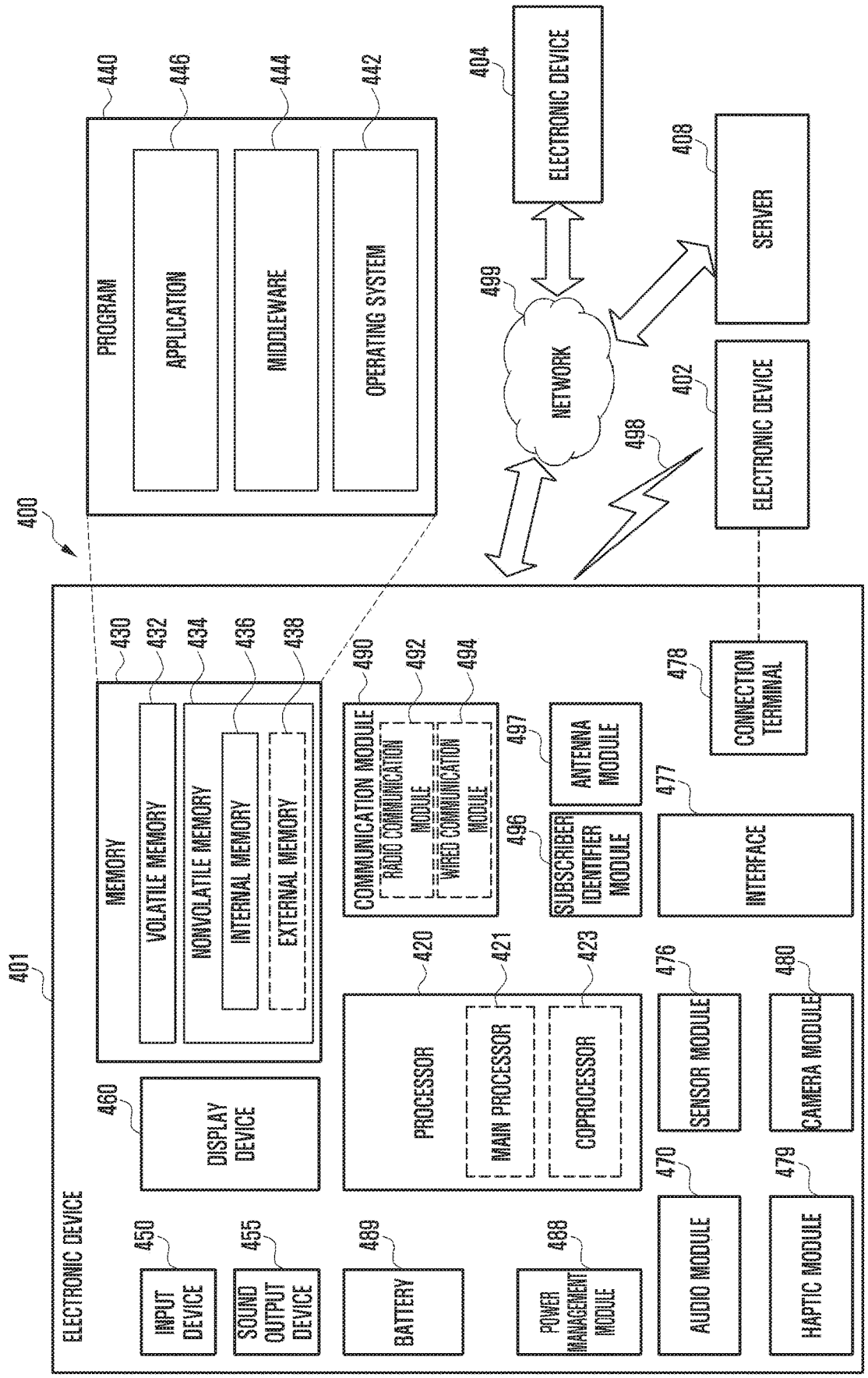
FIG. 4 is a block diagram of an electronic device in a network environment according to an embodiment of the disclosure.

FIG. 4 is a block diagram of an electronic device in a network environment according to an embodiment of the disclosure.

Referring to FIG. 4, an electronic device 401 in a network environment 400 may communicate with an electronic device 402 via a first network 498 (e.g., a short-range wireless communication network), or an electronic device 404 or a server 408 via a second network 499 (e.g., a long-range wireless communication network). According to an embodiment, the electronic device 401 may communicate with the electronic device 404 via the server 408. According to an embodiment, the electronic device 401 may include a processor 420, a memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 497. In some embodiments, at least one (e.g., the display device 460 or the camera module 480) of the components may be omitted from the electronic device 401, or one or more other components may be added in the electronic device 401. In some embodiments, some of the components may be implemented as single integrated circuitry. For example, the sensor module 476 (e.g., a fingerprint sensor, an iris sensor, or an illuminance sensor) may be implemented as embedded in the display device 460 (e.g., a display).

The processor 420 may execute, for example, software (e.g., a program 440) to control at least one other component (e.g., a hardware or software component) of the electronic device 401 coupled with the processor 420, and may perform various data processing or computation. According to one embodiment, as at least part of the data processing or computation, the processor 420 may load a command or data received from another component (e.g., the sensor module 476 or the communication module 490) in volatile memory 432, process the command or the data stored in the volatile memory 432, and store resulting data in non-volatile memory 434. According to an embodiment, the processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by another component (e.g., the processor 420) of the electronic device 401, from the outside (e.g., a user) of the electronic device 401. The input device 450 may include, for example, a microphone, a mouse, a keyboard, or a digital pen (e.g., a stylus pen).

The sound output device 455 may output sound signals to the outside of the electronic device 401. The sound output device 455 may include, for example, a speaker or a receiver. The speaker may be used for general purposes, such as playing multimedia or playing a recording, and the receiver may be used for an incoming call. According to an embodiment, the receiver may be implemented as separate from, or as part of the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. According to an embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to an embodiment, the audio module 470 may obtain the sound via the input device 450, or output the sound via the sound output device 455 or a headphone of an external electronic device (e.g., an electronic device 402) directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 401, and generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 402) directly (e.g., wiredly) or wirelessly. According to an embodiment, the interface 477 may include, for example, an HDMI, a USB interface, an SD card interface, or an audio interface.

A connecting terminal 478 may include a connector via which the electronic device 401 may be physically connected with the external electronic device (e.g., the electronic device 402). According to an embodiment, the connecting terminal 478 may include, for example, an HDMI connector, a USB connector, an SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes.

The power management module 488 may manage power supplied to the electronic device 401. According to one embodiment, the power management module 488 may be implemented as at least part of, for example, a power management integrated circuit (PMIC).

The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that is operable independently from the processor 420 (e.g., the application processor (AP)) and supports a direct (e.g., wired) communication or a wireless communication. According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™ wireless-fidelity (Wi-Fi) direct, or infrared data association (IrDA)) or the second network 499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. According to an embodiment, the antenna module 497 may include an antenna including a radiating element composed of a conductive material or a conductive pattern formed in or on a substrate (e.g., PCB). According to an embodiment, the antenna module 497 may include a plurality of antennas. In such a case, at least one antenna appropriate for a communication scheme used in the communication network, such as the first network 498 or the second network 499, may be selected, for example, by the communication module 490 (e.g., the wireless communication module 492) from the plurality of antennas. The signal or the power may then be transmitted or received between the communication module 490 and the external electronic device via the selected at least one antenna. According to an embodiment, another component (e.g., a radio frequency integrated circuit (RFIC)) other than the radiating element may be additionally formed as part of the antenna module 497.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 408 coupled with the second network 499. Each of the electronic devices 402 and 404 may be a device of a same type as, or a different type from, the electronic device 401. According to an embodiment, all or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 440) including one or more instructions that are stored in a storage medium (e.g., internal memory 436 or external memory 438) that is readable by a machine (e.g., the electronic device 401). For example, a processor (e.g., the processor 420) of the machine (e.g., the electronic device 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 5:
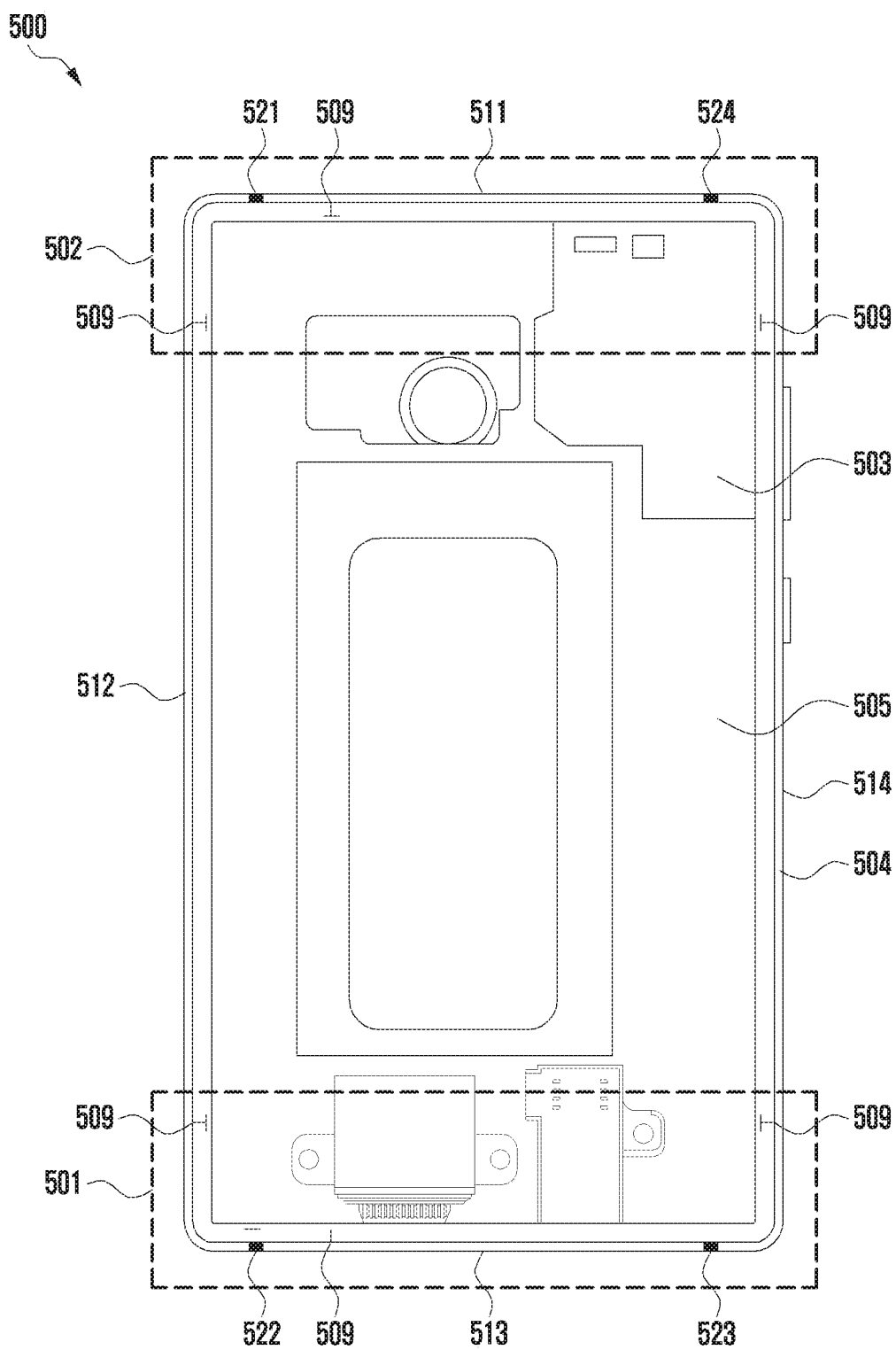
FIG. 5 shows the structure of an antenna apparatus according to an embodiment of the disclosure.

FIG. 5 shows the structure of an antenna apparatus according to an embodiment of the disclosure.

Referring to FIG. 5, a support member 503 (e.g., first support member 311, or second support member 360 in FIG. 3) disposed in an electronic device 500 (e.g., electronic device 300 in FIG. 3, or electronic device 401 in FIG. 4) may be coupled to a side bezel structure 504 (e.g., side bezel structure 310 in FIG. 3) or may be formed as a single body with the side bezel structure 504.

The support member 503 may be formed of, for example, a metal material and/or a non-metal material (e.g., polymer). The support member 503 may be coupled to a display (e.g., display 330 or display unit 460) on one surface and to a printed circuit board 505 (e.g., printed circuit board 340 in FIG. 3) on the other surface. A processor, a memory, and/or an interface may be mounted on the printed circuit board 505 (e.g., printed circuit board 340 in FIG. 3). The processor may include one or more of, for example, a central processing unit, an application processor, a graphics processing unit, an image signal processor, a sensor hub processor, and a communication processor.

The support member 503 may include a battery (e.g., battery 350 or battery 489). At least a portion of the battery (e.g., battery 350, or battery 489) may be disposed substantially coplanar with, for example, the printed circuit board 505 (e.g., printed circuit board 340 in FIG. 3). An antenna module (e.g., antenna 370 or antenna module 497) may be disposed between a back plate (e.g., back plate 380 in FIG. 3) and the battery (e.g., battery 350 or battery 489). The antenna module (e.g., antenna 370 or antenna module 497) may include, for example, a near field communication (NFC) antenna, a wireless charging antenna, and/or a magnetic secure transmission (MST) antenna. For example, the antenna module (e.g., antenna 370 in FIG. 3) can perform short-range communication with an external device or can wirelessly transmit and receive power required for charging. For the antenna module (e.g., antenna 370 or antenna module 497), the antenna element may be formed by a portion of the side bezel structure 504, or a portion of the support member 503, or a combination thereof.

The side bezel structure 504 may include segmented antenna apparatuses. The side bezel structure 504 may include one or more antenna apparatuses 511, 512, 513 and 514, and one or more photo-conductive materials 521, 522, 523 and 524.

Each of the at least one antenna apparatus 511, 512, 513 or 514 may include at least one ground 509.

The support member 503 may be coupled to the printed circuit board 505 (e.g., printed circuit board 340 in FIG. 3), and the antenna module (e.g., antenna 370 or antenna module 497) may be coupled to the printed circuit board 505 (e.g., printed circuit board 340 in FIG. 3).

Figure 6:
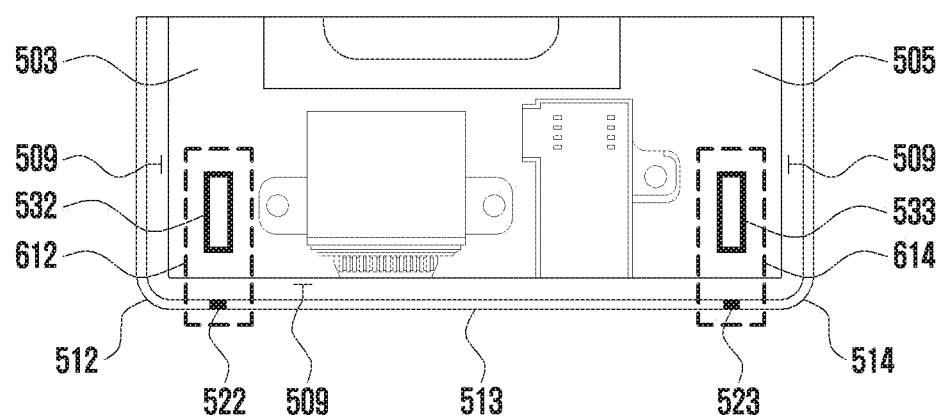
FIG. 6 is a detailed view of the region indicated by indicia 501 in the antenna apparatus shown in FIG. 5 according to an embodiment of the disclosure.
Figure 7:
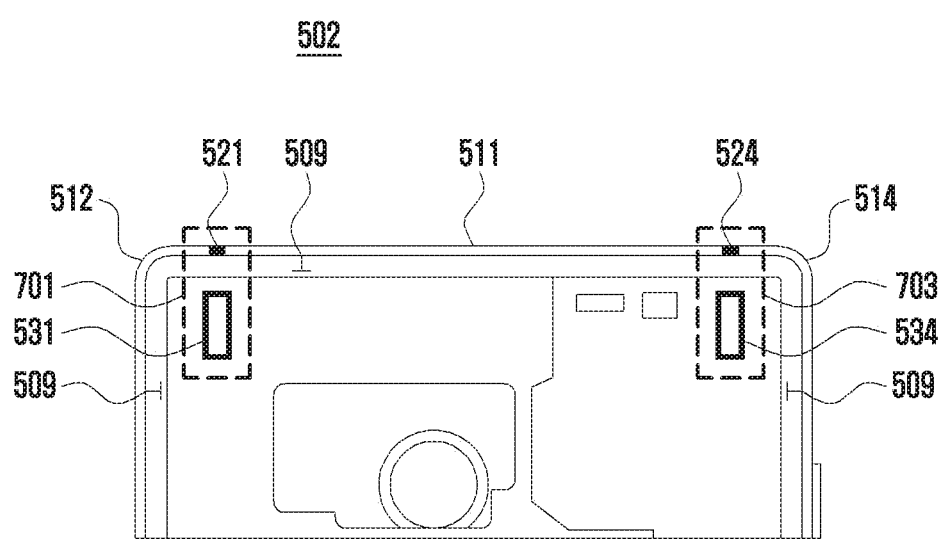
FIG. 7 is a detailed view of the region indicated by indicia 502 in the antenna apparatus shown in FIG. 5 according to an embodiment of the disclosure.

The processor (e.g., processor 420 in FIG. 4) included in the printed circuit board 505 (e.g., printed circuit board 340 in FIG. 3) may control at least one light source (e.g., light source 531, 532, 533 or 534 in FIG. 6 and FIG. 7).

The electronic device 500 may transmit and receive radio waves through the side bezel structure 504 under the control of the antenna module (e.g., antenna 370 or antenna module 497) or the communication module (e.g., communication module 490 in FIG. 4) on the printed circuit board 505 (e.g., printed circuit board 340 in FIG. 3).

The antenna module (e.g., antenna 370 or antenna module 497) or the communication module (e.g., communication module 490 in FIG. 4) may be electrically connected to the side bezel structure 504.

The electronic device 500 may transmit and receive radio waves through the segmented antenna apparatuses 511, 512, 513 and 514 and/or the photo-conductive materials 521, 522, 523 and 524 under the control of the antenna module (e.g., antenna 370 or antenna module 497) or the communication module (e.g., communication module 490 in FIG. 4) on the printed circuit board 505 (e.g., printed circuit board 340 in FIG. 3).

The antenna module (e.g., antenna 370 or antenna module 497) or the communication module (e.g., communication module 490 in FIG. 4) can be electrically connected to the segmented antenna apparatuses 511, 512, 513 and 514 and/or the photo-conductive materials 521, 522, 523 and 524.

In the side bezel structure 504, the photo-conductive materials 521, 522, 523 and 524 can be disposed between the segmented antenna apparatuses 511, 512, 513 and 514.

For example, the first photo-conductive material 521 may be disposed between the first antenna apparatus 511 and the second antenna apparatus 512, the second photo-conductive material 522 may be disposed between the second antenna apparatus 512 and the third antenna apparatus 513, the third photo-conductive material 523 may be disposed between the third antenna apparatus 513 and the fourth antenna apparatus 514, and the fourth photo-conductive material 524 may be disposed between the fourth antenna apparatus 514 and the first antenna apparatus 511.

In one embodiment, an insulation material can be applied on the surface where the photo-conductive material 521, 522, 523 or 524 faces the outside of the electronic device 500, so that external light cannot change the electrical state of the photo-conductive material 521, 522, 523 or 524.

According to various embodiments, in the electronic device 500 (e.g., electronic device 300, or electronic device 401), at least one light source may be disposed on the surface where the photo-conductive material 521, 522, 523 or 524 faces the inside of the electronic device 500 (e.g., electronic device 300, or electronic device 401). In the electronic device 500 (e.g., electronic device 300, or electronic device 401), the light source may be disposed corresponding to the surface where the photo-conductive material 521, 522, 523 or 524 faces the inside of the electronic device 500.

According to various embodiments, in the electronic device 500, the light source may be disposed at a preset distance from the photo-conductive material 521, 522, 523 or 524 on the surface where the photo-conductive material 521, 522, 523 or 524 faces the inside of the electronic device 500. The light source may emit at least one of visible light, infrared light, or ultraviolet light to the photo-conductive material 521, 522, 523 or 524.

The second antenna apparatus 512 and the fourth antenna apparatus 514 may be disposed on both sides of the electronic device 500 in a first direction (e.g., vertical direction), and the first antenna apparatus 511 and the third antenna apparatus 513 may be disposed on both sides in a second direction (e.g., horizontal direction).

FIG. 6 is a detailed view of the region indicated by indicia 501 in the antenna apparatus shown in FIG. 5 according to an embodiment of the disclosure.

Referring to FIG. 6, the support member 503 disposed in the electronic device 500 (e.g., electronic device 300, or electronic device 401) may be coupled to the second antenna apparatus 512, the third antenna apparatus 513 and the fourth antenna apparatus 514, or may be formed as a single body with the second antenna apparatus 512, the third antenna apparatus 513, and the fourth antenna apparatus 514. Each of the first antenna apparatus 511, the second antenna apparatus 512, the third antenna apparatus 513 and the fourth antenna apparatus 514 may include at least one ground 509.

The printed circuit board 505 (e.g., printed circuit board 340 in FIG. 3) may include a second light source 532 and a third light source 533. The second light source 532 and the third light source 533 may be turned on or off under the control of the processor (e.g., processor 420 in FIG. 4). For example, each of the second light source 532 and the third light source 533 may include a switch, and the switches may be electrically connected or disconnected according to the control signal of the processor (e.g., processor 410 in FIG. 4) so as to turn on or off the second light source 532 or the third light source 533.

In the electronic device 500 (e.g., electronic device 300, or electronic device 401), the second light source 532 may be disposed corresponding to the surface where the second photo-conductive material 522 faces the inside of the electronic device 500 (e.g., electronic device 300, or electronic device 401), and the third light source 533 may be disposed corresponding to the surface where the third photo-conductive material 523 faces the inside of the electronic device 500 (e.g., electronic device 300, or electronic device 401).

In the electronic device 500 (e.g., electronic device 300, or electronic device 401), the second light source 532 may be disposed at a preset distance from the second photo-conductive material 522 so as to correspond to the surface where the second photo-conductive material 522 faces the inside of the electronic device 500 (e.g., electronic device 300, or electronic device 401).

In the electronic device 500 (e.g., electronic device 300, or electronic device 401), the third light source 533 may be disposed at a preset distance from the third photo-conductive material 523 so as to correspond to the surface where the third photo-conductive material 523 faces the inside of the electronic device 500 (e.g., electronic device 300, or electronic device 401).

When the second light source 532 is turned on, the second photo-conductive material 522 may become electrically conductive.

When the second photo-conductive material 522 disposed between the second antenna apparatus 512 and the third antenna apparatus 513 becomes electrically conductive, the second antenna apparatus 512 and the third antenna apparatus 513 are electrically connected to each other and can operate as a single antenna.

When the second antenna apparatus 512 and the third antenna apparatus 513 are electrically connected, they may substantially be the second antenna apparatus 512 with an extended length or the third antenna apparatus 513 with an extended length.

When the second light source 532 is turned off, the second photo-conductive material 522 can become electrically non-conductive.

When the second photo-conductive material 522 disposed between the second antenna apparatus 512 and the third antenna apparatus 513 becomes electrically non-conductive, the second antenna apparatus 512 and the third antenna apparatus 513 are electrically disconnected and can operate as different antennas.

When the third light source 533 is turned on, the third photo-conductive material 523 may become electrically conductive.

When the third photo-conductive material 523 disposed between the fourth antenna apparatus 514 and the third antenna apparatus 513 becomes electrically conductive, the fourth antenna apparatus 514 and the third antenna apparatus 513 are electrically connected and can operate as a single antenna.

When the fourth antenna apparatus 514 and the third antenna apparatus 513 are electrically connected, they may substantially be the fourth antenna apparatus 514 with an extended length or the third antenna apparatus 513 with an extended length.

When the third light source 533 is turned off, the third photo-conductive material 523 can become electrically non-conductive.

When the third photo-conductive material 523 disposed between the fourth antenna apparatus 514 and the third antenna apparatus 513 becomes electrically non-conductive, the fourth antenna apparatus 514 and the third antenna apparatus 513 are electrically disconnected and can operate as different antennas.

For example, as indicated by indicia 612 and 614, when the second light source 532 is turned on and the third light source 533 is turned off, the second antenna apparatus 512 and the third antenna apparatus 513 are electrically connected to each other, so that they may substantially be the second antenna apparatus 512 with an extended length or the third antenna apparatus 513 with an extended length. When the second light source 532 is turned off and the third light source 533 is turned on, the fourth antenna apparatus 514 and the third antenna apparatus 513 are electrically connected to each other, so that they may substantially be the fourth antenna apparatus 514 with an extended length or the third antenna apparatus 513 with an extended length.

In various embodiments, when both the second light source 532 and the third light source 533 are turned on, the second, third and fourth antenna apparatuses 512, 513 and 514 may operate as a single antenna.

In various embodiments, whether to turn on the second light source 532 or the third light source 533 may be determined based on the grip position of the user detected by the electronic device 500 (e.g., electronic device 300, or electronic device 401). For example, the electronic device 500 (e.g., electronic device 300, or electronic device 401) may use a grip sensor (e.g., sensor module 476) to obtain grip information of the user. The electronic device 500 may turn off the light source corresponding to the antenna apparatus in which the user's grip is sensed and may turn on the light source corresponding to the antenna apparatus in which the user's grip is not sensed.

For example, when the electronic device 500 (e.g., electronic device 300, or electronic device 401) detects that the user is holding the fourth antenna apparatus 514 constituting a portion of the side bezel structure 504 by using a grip sensor (e.g., sensor module 476), it may turn off the third light source 533 that can change the electrical length of the fourth antenna apparatus 514 and may turn on the second light source 532 to change the electrical length of the second antenna apparatus 512 not being gripped by the user.

For example, when the electronic device 500 (e.g., electronic device 300, or electronic device 401) detects that the user is holding the second antenna apparatus 512 constituting a portion of the side bezel structure 504 by using a grip sensor, it may turn off the second light source 532 that can change the electrical length of the second antenna apparatus 512 and may turn on the third light source 533 to change the electrical length of the fourth antenna apparatus 514 not being gripped by the user.

In various embodiments, an insulation material can be applied on the surface where the second photo-conductive material 522 or the third photo-conductive material 523 faces the outside of the electronic device 500, so that external light cannot change the electrical state of the second photo-conductive material 522 or the third photo-conductive material 523.

In various embodiments, the electronic device 500 (e.g., electronic device 300, or electronic device 401) may identify the frequency band used for the antenna module (e.g., antenna 370, or antenna module 497) and determine whether to turn on the second light source 532 or the third light source 533 under the control of the communication module (e.g., communication module 490) or the processor (e.g., processor 420).

For example, under the control of the communication module (e.g., communication module 490) or the processor (e.g., processor 420), upon determining that the frequency band used by the antenna module (e.g., antenna 370 or antenna module 497) is lower than a specific frequency (e.g., low frequency band), the electronic device 500 (e.g., electronic device 300, or electronic device 401) may turn on the second light source 532 or the third light source 533 so as to electrically connect the third antenna apparatus 513 to the second antenna apparatus 512 or the fourth antenna apparatus 514.

FIG. 7 is a detailed view of the region indicated by indicia 502 in the antenna apparatus shown in FIG. 5 according to an embodiment of the disclosure.

Referring to FIG. 7, the support member 503 disposed in the electronic device 500 (e.g., electronic device 300, or electronic device 401) may be coupled to the first antenna apparatus 511, the second antenna apparatus 512 and the fourth antenna apparatus 514, or may be formed as a single body with the first antenna apparatus 511, the second antenna apparatus 512, and the fourth antenna apparatus 514. Each of the first antenna apparatus 511, the second antenna apparatus 512, the third antenna apparatus 513 and the fourth antenna apparatus 514 may include at least one ground 509.

The printed circuit board 505 (e.g., printed circuit board 340 in FIG. 3) may include a first light source 531 and a fourth light source 534. The first light source 531 and the fourth light source 534 may be turned on or off under the control of the processor (e.g., processor 420 in FIG. 4). For example, each of the first light source 531 and the fourth light source 534 may include a switch, and the switches may be electrically connected or disconnected according to the control signal of the processor so as to turn on or off the first light source 531 or the fourth light source 534.

In the electronic device 500 (e.g., electronic device 300, or electronic device 401), the first light source 532 may be disposed corresponding to the surface where the first photo-conductive material 521 faces the inside of the electronic device 500, and the fourth light source 534 may be disposed corresponding to the surface where the fourth photo-conductive material 524 faces the inside of the electronic device 500.

In the electronic device 500 (e.g., electronic device 300, or electronic device 401), the first light source 531 may be disposed at a preset distance from the first photo-conductive material 521, on the printed circuit board 505 (e.g., printed circuit board 340 in FIG. 3), so as to correspond to the surface where the first photo-conductive material 521 faces the inside of the electronic device 500.

In the electronic device 500 (e.g., electronic device 300, or electronic device 401), the fourth light source 534 may be disposed at a preset distance from the fourth photo-conductive material 524, on the printed circuit board 505 (e.g., printed circuit board 340 in FIG. 3), so as to correspond to the surface where the fourth photo-conductive material 524 faces the inside of the electronic device 500.

When the first light source 531 is turned on, the first photo-conductive material 521 may become electrically conductive.

When the first photo-conductive material 521 disposed between the second antenna apparatus 512 and the first antenna apparatus 511 becomes electrically conductive, the second antenna apparatus 512 and the first antenna apparatus 511 are electrically connected to each other and can operate as a single antenna.

When the second antenna apparatus 512 and the first antenna apparatus 511 are electrically connected, they may substantially be the second antenna apparatus 512 with an extended length or the first antenna apparatus 511 with an extended length.

When the first light source 531 is turned off, the first photo-conductive material 521 can become electrically non-conductive.

When the first photo-conductive material 521 disposed between the second antenna apparatus 512 and the first antenna apparatus 511 becomes electrically non-conductive, the second antenna apparatus 512 and the first antenna apparatus 511 are electrically disconnected and can operate as different antennas.

When the fourth light source 534 is turned on, the fourth photo-conductive material 524 may become electrically conductive.

When the fourth photo-conductive material 524 disposed between the fourth antenna apparatus 514 and the first antenna apparatus 511 becomes electrically conductive, the fourth antenna apparatus 514 and the first antenna apparatus 511 are electrically connected and can operate as a single antenna.

When the fourth antenna apparatus 514 and the first antenna apparatus 511 are electrically connected, they may substantially be the fourth antenna apparatus 514 with an extended length or the first antenna apparatus 511 with an extended length.

When the fourth light source 534 is turned off, the fourth photo-conductive material 524 can become electrically non-conductive.

When the fourth photo-conductive material 524 disposed between the fourth antenna apparatus 514 and the first antenna apparatus 511 becomes electrically non-conductive, the fourth antenna apparatus 514 and the first antenna apparatus 511 are electrically disconnected and can operate as different antennas.

For example, as indicated by indicia 701 and 703, when the first light source 531 is turned on and the fourth light source 534 is turned off, the second antenna apparatus 512 and the first antenna apparatus 511 are electrically connected to each other, so that they may substantially be the second antenna apparatus 512 with an extended length or the first antenna apparatus 511 with an extended length. When the first light source 531 is turned off and the fourth light source 534 is turned on, the fourth antenna apparatus 514 and the first antenna apparatus 511 are electrically connected to each other, so that they may substantially be the fourth antenna apparatus 514 with an extended length or the first antenna apparatus 511 with an extended length.

In various embodiments, when both the first light source 531 and the fourth light source 534 are turned on, the first, second and fourth antenna apparatuses 511, 512 and 514 may operate as a single antenna.

In various embodiments, whether to turn on the first light source 531 or the fourth light source 534 may be determined based on the grip position of the user detected by the electronic device 500 (e.g., electronic device 300, or electronic device 401). For example, the electronic device 500 (e.g., electronic device 300, or electronic device 401) may use a grip sensor to obtain grip information of the user. The electronic device 500 may turn off the light source corresponding to the antenna apparatus in which the user's grip is sensed and may turn on the light source corresponding to the antenna apparatus in which the user's grip is not sensed.

For example, when the electronic device 500 (e.g., electronic device 300, or electronic device 401) detects that the user is holding the fourth antenna apparatus 514 constituting a portion of the side bezel structure 504 by using a grip sensor, it may turn off the fourth light source 534 that can change the electrical length of the fourth antenna apparatus 514 and may turn on the first light source 531 to change the electrical length of the second antenna apparatus 512 not being gripped by the user.

For example, when the electronic device 500 (e.g., electronic device 300, or electronic device 401) detects that the user is holding the second antenna apparatus 512 constituting a portion of the side bezel structure 504 by using a grip sensor, it may turn off the first light source 532 that can change the electrical length of the second antenna apparatus 512 and may turn on the fourth light source 534 to change the electrical length of the fourth antenna apparatus 514 not being gripped by the user.

In various embodiments, an insulation material can be applied on the surface where the first photo-conductive material 521 or the fourth photo-conductive material 524 faces the outside of the electronic device 500, so that external light cannot change the electrical state of the first photo-conductive material 521 or the fourth photo-conductive material 524.

In various embodiments, the electronic device 500 (e.g., electronic device 300, or electronic device 401) may identify the frequency band used for the antenna module (e.g., antenna 370, or antenna module 497) and determine whether to turn on the first light source 531 or the fourth light source 534 under the control of the communication module (e.g., communication module 490) or the processor (e.g., processor 420).

For example, under the control of the communication module (e.g., communication module 490) or the processor (e.g., processor 420), upon determining that the frequency band used by the antenna module (e.g., antenna 370 or antenna module 497) is lower than a specific frequency (e.g., low frequency band), the electronic device 500 (e.g., electronic device 300, or electronic device 401) may turn on the first light source 531 or the fourth light source 534 so as to electrically connect the first antenna apparatus 511 to the second antenna apparatus 512 or the fourth antenna apparatus 514.

Figure 8:
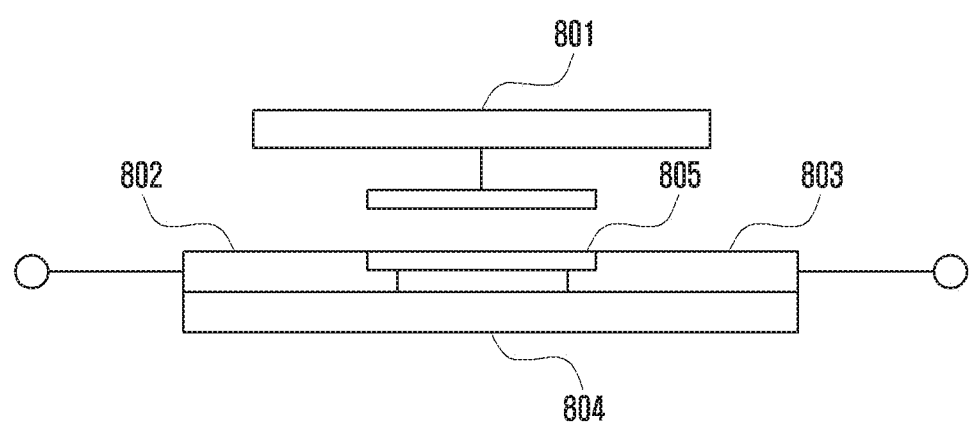
FIG. 8 is an illustration of controlling the photo-conductive material according to an embodiment of the disclosure.

FIG. 8 is an illustration of controlling the photo-conductive material according to an embodiment of the disclosure.

Referring to FIG. 8, a first conductor 802 (e.g., first to fourth antenna apparatus 511, 512, 513 or 514), a second conductor 803 (e.g., first to fourth antenna apparatus 511, 512, 513 or 514), and a photo-conductive material 805 (e.g., photo-conductive material 521, 522, 523 or 524) may be included on a board 804.

A light source 801 (e.g., first to fourth light source 531, 532, 533 or 534) may be disposed in a region spaced a preset distance from the photo-conductive material 805 so as to correspond to the photo-conductive material 805.

The photo-conductive material 805 may be disposed between the first conductor 802 and the second conductor 803. The electrical state of the photo-conductive material 805 may be changed to a conductive state or a non-conductive state depending on whether the light source 801 spaced by a preset distance from the photo-conductive material 805 is turned on or off.

For example, when the light source 801 is turned on, the electrical state of the photo-conductive material 805 becomes conductive, and the first conductor 802 and the second conductor 803 can be electrically connected. When the light source 801 is turned off, the electrical state of the photo-conductive material 805 becomes non-conductive, and the first conductor 802 and the second conductor 803 can be electrically disconnected.

Figure 9:
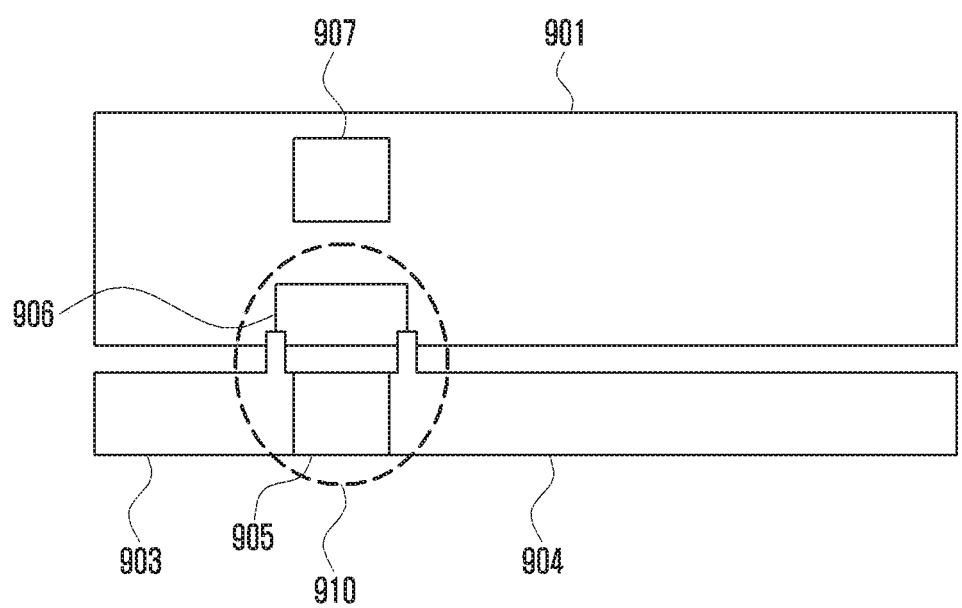
FIG. 9 illustrates a segment structure according to an embodiment of the disclosure.

FIG. 9 illustrates a segment structure according to an embodiment of the disclosure.

Referring to FIG. 9, the electronic device 500 (e.g., electronic device 300, or electronic device 401) may include a board 901, a first conductor 903 (e.g., first to fourth antenna apparatus 511, 512, 513 or 514), a second conductor 904 (e.g., first to fourth antenna apparatus 511, 512, 513 or 514), an insulation material 905, a photo-conductive material 906 (e.g., photo-conductive material 521, 522, 523 or 524), and a light source 907.

The photo-conductive material 906, the light source 907, at least a portion of the first conductor 903, and at least a portion of the second conductor 904 may be disposed on the board 901.

In the segment structure 910, at least a portion of the first conductor 903 and at least a portion of the second conductor 904 may be connected to the photo-conductive material 906.

In the segment structure 910, at least a portion of the first conductor 903 and at least a portion of the second conductor 904 may protrude so that the first conductor 903 and the second conductor 904 can be coupled to the board 901.

In the segment structure 910, a portion of the first conductor 903 that is not coupled to the board 901 and a portion of the second conductor 904 that is not coupled to the board 901 may be connected by the insulation material 905.

The light source 907 (e.g., first to fourth light source 531, 532, 533 or 534) may be disposed at a preset distance from the photo-conductive material 906 in a region corresponding to the photo-conductive material 906. The electrical state of the photo-conductive material 906 may be changed to a conductive state or a non-conductive state depending on whether the light source 907 spaced by a preset distance from the photo-conductive material 906 is turned on or off.

For example, when the light source 907 is turned on, the electrical state of the photo-conductive material 906 becomes conductive, and the first conductor 903 and the second conductor 904 can be electrically connected. When the light source 907 is turned off, the electrical state of the photo-conductive material 906 becomes non-conductive, and the first conductor 903 and the second conductor 904 can be electrically disconnected.

Figure 10:
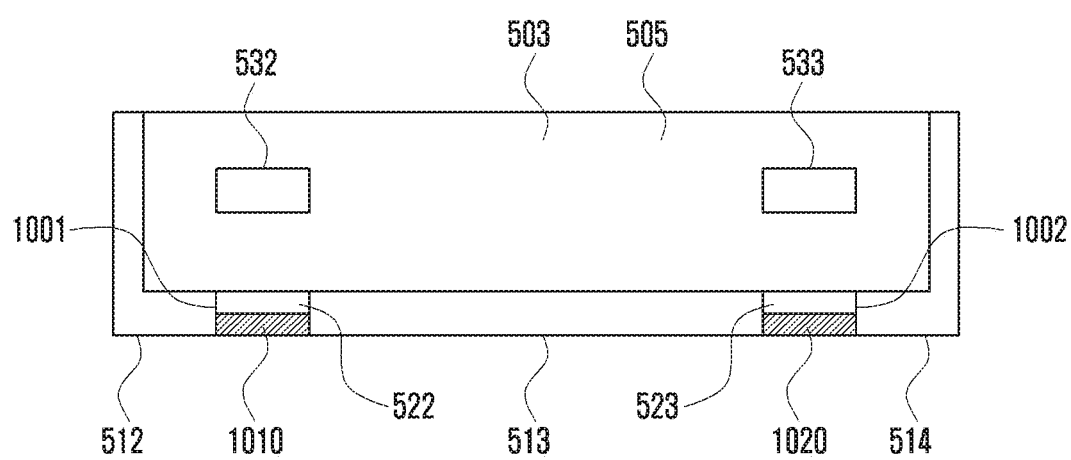
FIG. 10 illustrates various embodiments for the region indicated by indicia 501 in the antenna apparatus shown in FIG. 5 according to an embodiment of the disclosure.

FIG. 10 illustrates various embodiments for the region indicated by indicia 501 in the antenna apparatus shown in FIG. 5 according to an embodiment of the disclosure.

Referring to FIG. 10, the support member 503 disposed in the electronic device 500 (e.g., electronic device 300, or electronic device 401) may be coupled to the second antenna apparatus 512, the third antenna apparatus 513 and the fourth antenna apparatus 514, or may be formed as a single body with the second antenna apparatus 512, the third antenna apparatus 513, and the fourth antenna apparatus 514.

The printed circuit board 505 (e.g., printed circuit board 340 in FIG. 3) may include the second light source 532 and the third light source 533. The second light source 532 and the third light source 533 may be turned on or off under the control of the processor (e.g., processor 420 in FIG. 4). For example, each of the second light source 532 and the third light source 533 may include a switch, and the switches may be electrically connected or disconnected according to the control signal of the processor so as to turn on or off the second light source 532 or the third light source 533.

In the electronic device 500 (e.g., electronic device 300, or electronic device 401), a first coupling member 1001 may be disposed between the second antenna apparatus 512 and the third antenna apparatus 513, and a second coupling member 1002 may be disposed between the third antenna apparatus 513 and the fourth antenna apparatus 514.

The first coupling member 1001 may include the second photo-conductive material 522 and a first insulation member 1010. The second coupling member 1002 may include the third photo-conductive material 523 and a second insulation member 1020.

In the electronic device 500 (e.g., electronic device 300, or electronic device 401), the second light source 532 may be disposed corresponding to the surface where the second photo-conductive material 522 faces the inside of the electronic device 500, and the first insulation member 1010 may be disposed so as to face the outside of the electronic device 500.

In the electronic device 500 (e.g., electronic device 300, or electronic device 401), the third light source 533 may be disposed corresponding to the surface where the third photo-conductive material 523 faces the inside of the electronic device 500, and the second insulation member 1020 may be disposed so as to face the outside of the electronic device 500.

In the electronic device 500 (e.g., electronic device 300, or electronic device 401), the second light source 532 may be disposed at a preset distance from the second photo-conductive material 522 so as to correspond to the surface where the second photo-conductive material 522 faces the inside of the electronic device 500.

In the electronic device 500 (e.g., electronic device 300, or electronic device 401), the third light source 533 may be disposed at a preset distance from the third photo-conductive material 523 so as to correspond to the surface where the third photo-conductive material 523 faces the inside of the electronic device 500.

When the second light source 532 is turned on, the second photo-conductive material 522 may become electrically conductive.

When the second photo-conductive material 522 disposed between the second antenna apparatus 512 and the third antenna apparatus 513 becomes electrically conductive, the second antenna apparatus 512 and the third antenna apparatus 513 are electrically connected to each other and can operate as a single antenna.

When the second antenna apparatus 512 and the third antenna apparatus 513 are electrically connected, they may substantially be the second antenna apparatus 512 with an extended length or the third antenna apparatus 513 with an extended length.

When the second light source 532 is turned off, the second photo-conductive material 522 can become electrically non-conductive.

When the second photo-conductive material 522 disposed between the second antenna apparatus 512 and the third antenna apparatus 513 becomes electrically non-conductive, the second antenna apparatus 512 and the third antenna apparatus 513 are electrically disconnected and can operate as different antennas.

When the third light source 533 is turned on, the third photo-conductive material 523 may become electrically conductive.

When the third photo-conductive material 523 disposed between the fourth antenna apparatus 514 and the third antenna apparatus 513 becomes electrically conductive, the fourth antenna apparatus 514 and the third antenna apparatus 513 are electrically connected and can operate as a single antenna.

When the fourth antenna apparatus 514 and the third antenna apparatus 513 are electrically connected, they may substantially be the fourth antenna apparatus 514 with an extended length or the third antenna apparatus 513 with an extended length.

When the third light source 533 is turned off, the third photo-conductive material 523 can become electrically non-conductive.

When the third photo-conductive material 523 disposed between the fourth antenna apparatus 514 and the third antenna apparatus 513 becomes electrically non-conductive, the fourth antenna apparatus 514 and the third antenna apparatus 513 are electrically disconnected and can operate as different antennas.

Figure 11:
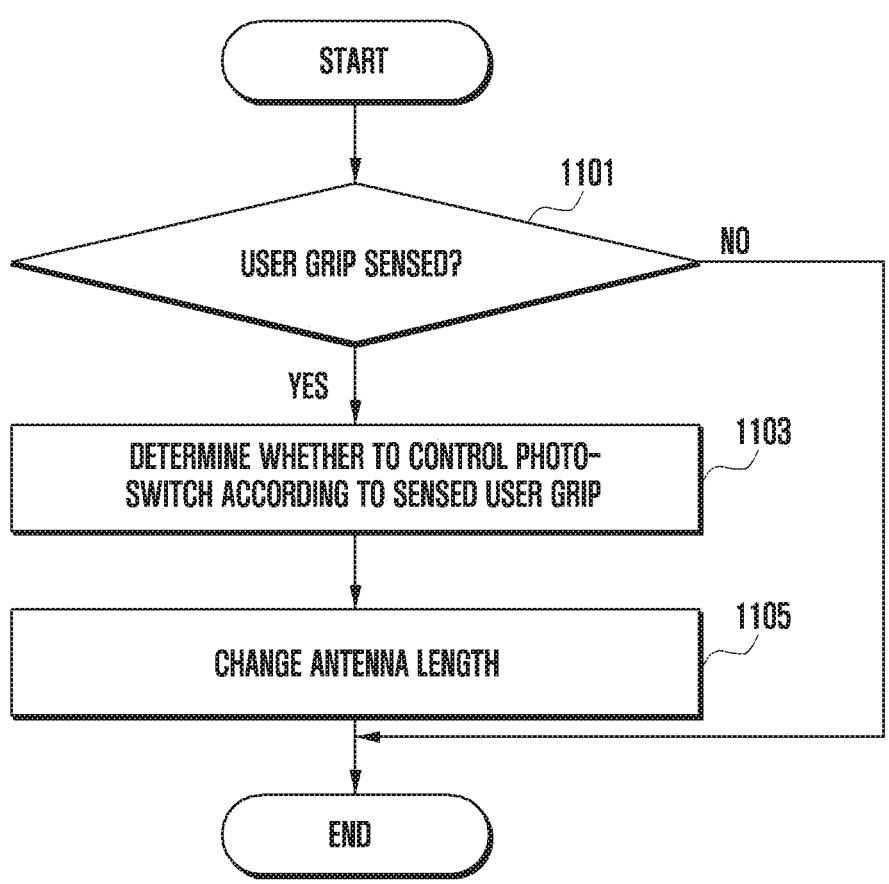
FIG. 11 is a flowchart of an antenna control method according to an embodiment of the disclosure.

FIG. 11 is a flowchart of an antenna control method according to an embodiment of the disclosure.

Referring to FIG. 11, the electronic device 500 (e.g., electronic device 300, or electronic device 401) may sense the user grip through the grip sensor under the control of the processor 420 at operation 1101.

At operation 1103, the electronic device 500 (e.g., electronic device 300, or electronic device 401) may determine whether to control the light source according to the sensed user grip under the control of the processor 420. As an example, the electronic device 500 (e.g., electronic device 300, or electronic device 401) may change the electrical length of the antenna by altering the electrical state of the photo-conductive material under the control of the processor 420. Changing the electrical length of the antenna by altering the electrical state of the photo-conductive material corresponds to electrically connecting at least two segmented conductive antenna apparatuses. At least two segmented conductive antenna apparatuses are connected by a photo-conductive material being non-conductive before the photo-conductive material is irradiated by the light source. When the photo-conductive material is irradiated by the light source, the at least two segmented conductive antenna apparatuses may be electrically connected to each other and may operate as an antenna having a changed length.

At operation 1103, the electronic device 500 (e.g., electronic device 300, or electronic device 401) may use a grip sensor (e.g., sensor module 476) to obtain grip information of the user. The electronic device 500 may turn off the light source corresponding to the antenna apparatus in which the user's grip is sensed and may turn on the light source corresponding to the antenna apparatus in which the user's grip is not sensed.

For example, when the electronic device 500 (e.g., electronic device 300, or electronic device 401) detects that the user is holding the fourth antenna apparatus 514 constituting a portion of the side bezel structure 504 by using a grip sensor (e.g., sensor module 476), it may turn off the third light source 533 that can change the electrical length of the fourth antenna apparatus 514 and may turn on the second light source 532 to change the electrical length of the second antenna apparatus 512 not being gripped by the user.

For example, when the electronic device 500 (e.g., electronic device 300, or electronic device 401) detects that the user is holding the second antenna apparatus 512 constituting a portion of the side bezel structure 504 by using a grip sensor, it may turn off the second light source 532 that can change the electrical length of the second antenna apparatus 512 and may turn on the third light source 533 to change the electrical length of the fourth antenna apparatus 514 not being gripped by the user.

For example, when the electronic device 500 (e.g., electronic device 300, or electronic device 401) detects that the user is holding the fourth antenna apparatus 514 constituting a portion of the side bezel structure 504 by using a grip sensor, it may turn off the fourth light source 534 that can change the electrical length of the fourth antenna apparatus 514 and may turn on the first light source 531 to change the electrical length of the second antenna apparatus 512 not being gripped by the user.

For example, when the electronic device 500 (e.g., electronic device 300, or electronic device 401) detects that the user is holding the second antenna apparatus 512 constituting a portion of the side bezel structure 504 by using a grip sensor, it may turn off the first light source 531 that can change the electrical length of the second antenna apparatus 512 and may turn on the fourth light source 534 to change the electrical length of the fourth antenna apparatus 514 not being gripped by the user.

At operation 1105, the electronic device 500 (e.g., electronic device 300, or electronic device 401) can perform communication according to the changed antenna length under the control of the processor 420.

Figure 12:
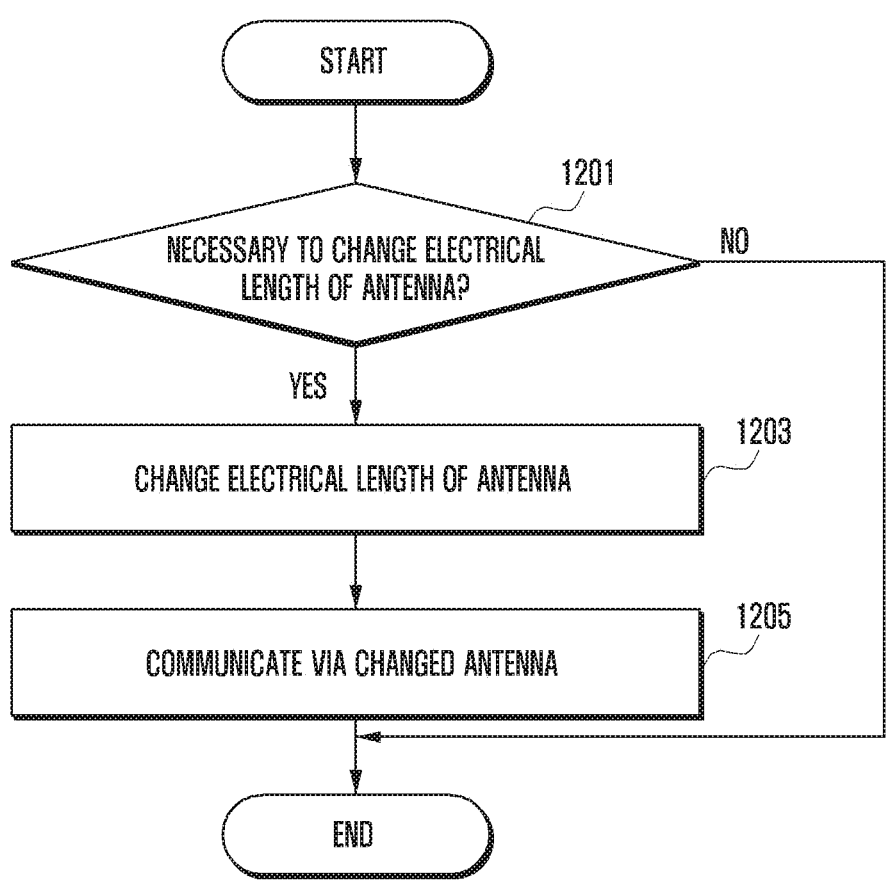
FIG. 12 is a flowchart of an antenna control method according to an embodiment of the disclosure.

FIG. 12 is a flowchart of an antenna control method according to an embodiment of the disclosure.

Referring to FIG. 12, the electronic device 500 (e.g., electronic device 300, or electronic device 401) can determine whether it is necessary to change the antenna length under the control of the processor 420 at operation 1201.

For example, during carrier aggregation (CA) communication, the electronic device 500 (e.g., electronic device 300, or electronic device 401) can determine whether a change in the frequency band is required and determine whether to change the antenna length. In the case of a low frequency band, it is necessary to extend the electrical length of the antenna.

The electronic device 500 (e.g., electronic device 300, or electronic device 401) can determine whether it is necessary to change the electrical length of the antenna according to the communication state under the control of the processor 420. Upon determining that it is necessary to change the electrical length of the antenna, the procedure may proceed from operation 1201 to operation 1203.

At operation 1203, the electronic device 500 (e.g., electronic device 300, or electronic device 401) may change the electrical length of the antenna under the control of the processor 420.

For example, the electronic device 500 (e.g., electronic device 300, or electronic device 401) may determine whether to control the light source (e.g., first light source 531, second light source 532, third light source 533, or fourth light source 534) under the control of processor 420.

For example, the electronic device 500 (e.g., electronic device 300, or electronic device 401) may change the electrical length of the antenna by altering the electrical state of the photo-conductive material under the control of the processor 420. Changing the electrical length of the antenna by altering the electrical state of the photo-conductive material corresponds to electrically connecting at least two segmented conductive antenna apparatuses. At least two segmented conductive antenna apparatuses are connected through a photo-conductive material being non-conductive before the photo-conductive material is irradiated by the light source. When the photo-conductive material is irradiated by the light source, the at least two segmented conductive antenna apparatuses may be electrically connected to each other and may operate as an antenna having a changed length.

For example, the electronic device 500 (e.g., electronic device 300, or electronic device 401) may identify the frequency band used for the antenna module (e.g., antenna 370, or antenna module 497) and determine whether to turn on the second light source 532 or the third light source 533 under the control of the communication module (e.g., communication module 490) or the processor (e.g., processor 420).

For example, under the control of the communication module (e.g., communication module 490) or the processor (e.g., processor 420), upon determining that the frequency band used by the antenna module (e.g., antenna 370 or antenna module 497) is lower than a specific frequency (e.g., low frequency band), the electronic device 500 (e.g., electronic device 300, or electronic device 401) may turn on the second light source 532 or the third light source 533 so as to electrically connect the third antenna apparatus 513 to the second antenna apparatus 512 or the fourth antenna apparatus 514.

For example, under the control of the communication module (e.g., communication module 490) or the processor (e.g., processor 420), upon determining that the frequency band used by the antenna module (e.g., antenna 370 or antenna module 497) is lower than a specific frequency (e.g., low frequency band), the electronic device 500 (e.g., electronic device 300, or electronic device 401) may turn on the first light source 531 or the fourth light source 534 so as to electrically connect the first antenna apparatus 511 to the second antenna apparatus 512 or the fourth antenna apparatus 514.

At operation 1205, the electronic device 500 (e.g., electronic device 300, or electronic device 401) can perform communication according to the changed antenna length under the control of the processor 420.

Figure 13:
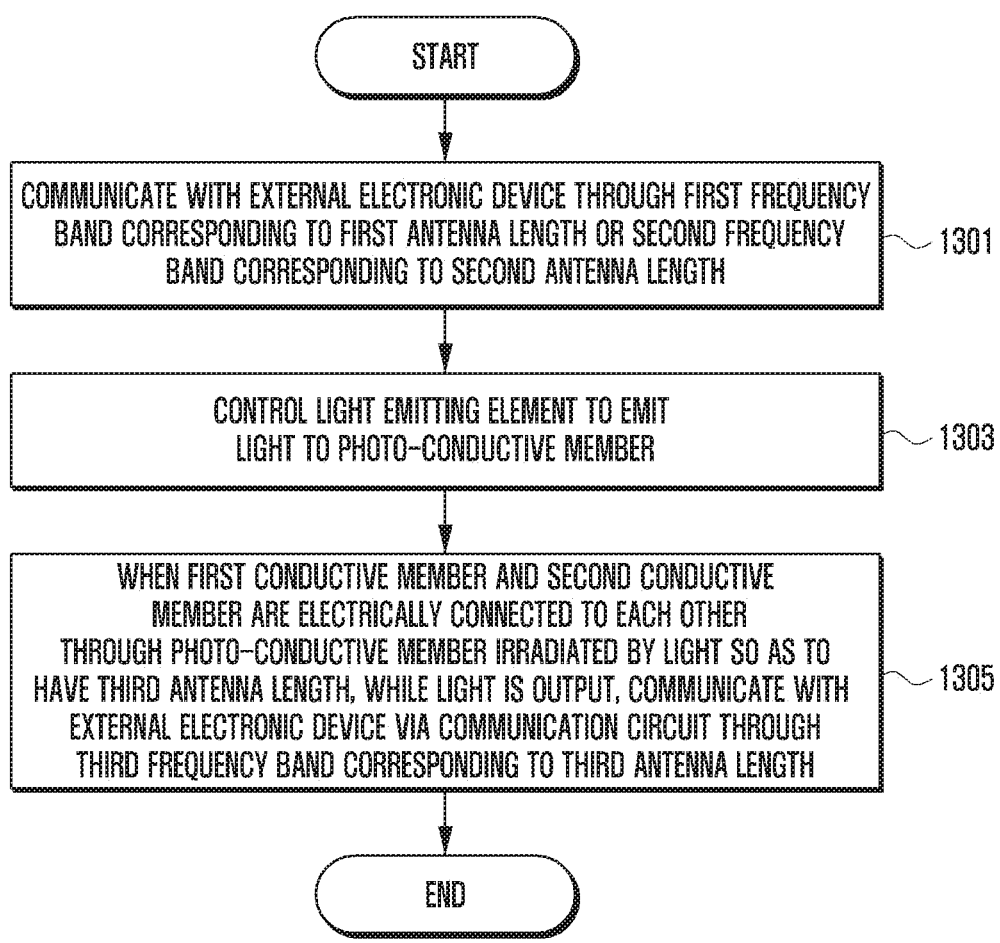
FIG. 13 is a flowchart of an antenna control method according to an embodiment of the disclosure.

FIG. 13 is a flowchart of an antenna control method according to an embodiment of the disclosure.

Referring to FIG. 13, while light is not output from the light emitting element (e.g., first light source 531, second light source 532, third light source 533, or fourth light source 534), the electronic device 500 (e.g., electronic device 300, or electronic device 401) may communicate with an external electronic device (e.g., external electronic device 402, 404 or 408) via the communication circuit (e.g., communication module 490 in FIG. 4) through a first frequency band corresponding to a first conductive member (e.g., antenna apparatus 511, 512, 513 or 514) with a first antenna length or a second frequency band corresponding to a second conductive member (e.g., antenna apparatus 511, 512, 513 or 514) with a second antenna length at operation 1301.

At operation 1303, the electronic device 500 (e.g., electronic device 300, or electronic device 401) may control the light emitting element (e.g., first light source 531, second light source 532, third light source 533, or fourth light source 534) to emit light to the photo-conductive member (e.g., photo-conductive material 521, 522, 523 or 524) under the control of the processor 420.

At operation 1305, when the first conductive member (e.g., antenna apparatus 511, 512, 513 or 514) and the second conductive member (e.g., antenna apparatus 511, 512, 513 or 514) are electrically connected to each other through the photo-conductive member (e.g., photo-conductive material 521, 522, 523 or 524) irradiated by light so as to have a third antenna length, while light is output from the light emitting element, the electronic device 500 (e.g., electronic device 300, or electronic device 401) may communicate with the external electronic device (e.g., external electronic device 402, 404 or 408) via the communication circuit (e.g., communication module 490 in FIG. 4) through a third frequency band corresponding to the third antenna length.

According to various embodiments of the disclosure, the electronic device 500 (e.g., electronic device 300, or electronic device 401) may include a housing including a first plate (e.g., first plate 110A in FIG. 1) facing a front of the electronic device, a second plate (e.g., second plate 110B in FIG. 1) facing away from the first plate, and a side bezel structure (e.g., side bezel structure 118) surrounding a space between the first plate and the second plate, and a printed circuit board 505 (e.g., printed circuit board 340 in FIG. 3) disposed at least at a portion of the space and including at least one processor (e.g., processor 420 in FIG. 4), an antenna module, and at least one light source (e.g., first light source 531, second light source 532, third light source 533, or fourth light source 534) controlled by the at least one processor, wherein the side bezel structure (e.g., side bezel structure 118) may include at least two segmented antenna apparatuses 511, 512, 513 and 514 and at least one photo-conductive material 521, 522, 523 or 524 disposed between the segmented antenna apparatuses 511, 512, 513 and 514, and wherein the printed circuit board 505 (e.g., printed circuit board 340 in FIG. 3) may include the at least one light source (e.g., first light source 531, second light source 532, third light source 533, or fourth light source 534) separated by a preset distance from the at least one photo-conductive material in a direction corresponding to the at least one photo-conductive material 521, 522, 523 or 524.

In various embodiments, upon determining that it is necessary to change an antenna length according to a communication situation, the at least one processor (e.g., processor 420 in FIG. 4) may be configured to change the electrical state of the at least one photo-conductive material 521, 522, 523 or 524 by controlling the at least one light source (e.g., first light source 531, second light source 532, third light source 533, or fourth light source 534).

In various embodiments, the printed circuit board 505 (e.g., printed circuit board 340 in FIG. 3) may further include a grip sensor (e.g., sensor module 476), and the at least one processor (e.g., processor 420 in FIG. 4) may be configured to sense the user's grip on the electronic device 500 (e.g., electronic device 300 in FIG. 3, or electronic device 401 in FIG. 4) by use of the grip sensor (e.g., sensor module 476).

In various embodiments, the at least one processor (e.g., processor 420 in FIG. 4) may be configured to select some of the at least one light source (e.g., first light source 531, second light source 532, third light source 533, and fourth light source 534) based on at least the grip information, and turn on the selected light source.

In various embodiments, the at least one processor (e.g., processor 420 in FIG. 4) may be configured to identify the grip position of the user based on at least the grip information, and select a light source (e.g., first light source 531, second light source 532, third light source 533, or fourth light source 534) separated by a preset distance or more from the grip position.

In various embodiments, the photo-conductive material 521, 522, 523 or 524 may be coupled with an insulation material (e.g., insulation material 905) on a surface facing the outside of the electronic device 500 (e.g., electronic device 300 in FIG. 3, or electronic device 401 in FIG. 4).

In various embodiments, the segmented antenna apparatuses 511, 512, 513 and 514 may include a conductive material.

According to various embodiments of the disclosure, the electronic device 500 (e.g., electronic device 300 in FIG. 3, or electronic device 401 in FIG. 4) may include a light emitting element (e.g., first light source 531, second light source 532, third light source 533, or fourth light source 534), an antenna structure (e.g., antenna apparatus 511, 512, 513 or 514) including a first conductive member (e.g., antenna apparatus 511, 512, 513 or 514) having a first antenna length, a second conductive member (e.g., antenna apparatus 511, 512, 513 or 514) having a second antenna length, and a photo-conductive member (e.g., photo-conductive material 521, 522, 523 or 524) disposed between the first conductive member and the second conductive member, and configured to constitute at least a portion of the outer surface of the electronic device 500, a communication circuit (e.g., communication module 490 in FIG. 4) electrically connected to the first conductive member (e.g., antenna apparatus 511, 512, 513 or 514) and the second conductive member (e.g., antenna apparatus 511, 512, 513 or 514), and at least one processor (e.g., processor 420 in FIG. 4), wherein the at least one processor (e.g., processor 420 in FIG. 4) may be configured to communicate with, while light is not output from the light emitting element (e.g., first light source 531, second light source 532, third light source 533, or fourth light source 534), an external electronic device via the communication circuit (e.g., communication module 490 in FIG. 4) through a first frequency band corresponding to the first antenna length or a second frequency band corresponding to the second antenna length, control the light emitting element (e.g., first light source 531, second light source 532, third light source 533, or fourth light source 534) to emit light to the photo-conductive member (e.g., photo-conductive material 521, 522, 523 or 524), and control, when the first conductive member (e.g., antenna apparatus 511, 512, 513 or 514) and the second conductive member (e.g., antenna apparatus 511, 512, 513 or 514) are electrically connected to each other through the photo-conductive member (e.g., photo-conductive material 521, 522, 523 or 524) irradiated by light so as to have a third antenna length, while light is output from the light emitting element, the communication circuit (e.g., communication module 490 in FIG. 4) to communicate with the external electronic device through a third frequency band corresponding to the third antenna length.

In various embodiments, upon determining that it is necessary to change the antenna length according to the communication situation, the at least one processor (e.g., processor 420 in FIG. 4) may be configured to control the light emitting element (e.g., first light source 531, second light source 532, third light source 533, or fourth light source 534) so as to change the electrical state of the at least one photo-conductive member (e.g., photo-conductive material 521, 522, 523 or 524).

In various embodiments, the electronic device 500 (e.g., electronic device 300 in FIG. 3, or electronic device 401 in FIG. 4) may further include a grip sensor (e.g., sensor module 476), and may obtain grip information about the grip position of the user on the electronic device 500 through the grip sensor (e.g., sensor module 476).

In various embodiments, the at least one processor (e.g., processor 420 in FIG. 4) may be configured to control the light emitting element (e.g., first light source 531, second light source 532, third light source 533, or fourth light source 534) based on the grip information.

In various embodiments, the at least one processor (e.g., processor 420 in FIG. 4) may be configured to identify the frequency band used by the communication circuit (e.g., communication module 490 in FIG. 4) so as to control the light emitting element (e.g., first light source 531, second light source 532, third light source 533, or fourth light source 534).

In various embodiments, the photo-conductive member (e.g., photo-conductive material 521, 522, 523 or 524) may be coupled with an insulation material (e.g., insulation material 905) on a surface facing the outside of the electronic device 500 (e.g., electronic device 300 in FIG. 3, or electronic device 401 in FIG. 4).

According to various embodiments of the disclosure, the electronic device 500 (e.g., electronic device 300 in FIG. 3, or electronic device 401 in FIG. 4) may include a light emitting element (e.g., first light source 531, second light source 532, third light source 533, or fourth light source 534), a first conductive member (e.g., antenna apparatus 511, 512, 513 or 514) having a first antenna length, a second conductive member (e.g., antenna apparatus 511, 512, 513 or 514) having a second antenna length, a photo-conductive member (e.g., photo-conductive material 521, 522, 523 or 524) disposed between the first conductive member and the second conductive member, and a control circuit (e.g., processor 420 in FIG. 4), wherein the control circuit may be configured to control the light emitting element (e.g., first light source 531, second light source 532, third light source 533, or fourth light source 534) to emit light to the photo-conductive member (e.g., photo-conductive material 521, 522, 523 or 524), and electrically connect the first conductive member (e.g., antenna apparatus 511, 512, 513 or 514) and the second conductive member (e.g., antenna apparatus 511, 512, 513 or 514) through the photo-conductive member (e.g., photo-conductive material 521, 522, 523 or 524) irradiated by light so as to have a third antenna length.

In various embodiments, upon determining that it is necessary to change the antenna length according to the communication situation, the control circuit may be configured to control the light emitting element (e.g., first light source 531, second light source 532, third light source 533, or fourth light source 534) so as to change the electrical state of the at least one photo-conductive member (e.g., photo-conductive material 521, 522, 523 or 524).

In various embodiments, the electronic device 500 (e.g., electronic device 300 in FIG. 3, or electronic device 401 in FIG. 4) may further include a grip sensor (e.g., sensor module 476), and may obtain grip information about the grip position of the user on the electronic device 500 through the grip sensor (e.g., sensor module 476).

In various embodiments, the control circuit (e.g., processor 420 in FIG. 4) may be configured to control the light emitting element (e.g., first light source 531, second light source 532, third light source 533, or fourth light source 534) based on the grip information.

In various embodiments, the control circuit (e.g., processor 420 in FIG. 4) may be configured to identify the frequency band used by the communication circuit (e.g., communication module 490 in FIG. 4) so as to control the light emitting element (e.g., first light source 531, second light source 532, third light source 533, or fourth light source 534).

In various embodiments, the photo-conductive member (e.g., photo-conductive material 521, 522, 523 or 524) may be coupled with an insulation material (e.g., insulation material 905) on a surface facing the outside of the electronic device 500 (e.g., electronic device 300 in FIG. 3, or electronic device 401 in FIG. 4).

The electronic device according to various embodiments may be any one of various types of electronic devices. The electronic devices may include, for example, a portable communication device (e.g., smartphone), a computer, a portable multimedia device, a portable medical device, a camera, a wearable device, and a home appliance. According to an embodiment of the disclosure, the electronic device is not limited to those described above.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing including a first plate facing a front of the electronic device, a second plate facing away from the first plate, and a side bezel structure surrounding a space between the first plate and the second plate; and
a printed circuit board disposed at least at a portion of the space and including at least one processor, an antenna module, and at least one light source controlled by the at least one processor,
wherein the side bezel structure includes at least two segmented antenna apparatuses and at least one photo-conductive material disposed between the segmented antenna apparatuses to connect the segmented antenna apparatuses,
wherein the printed circuit board includes the at least one light source separated by a preset distance from the at least one photo-conductive material in a direction towards the at least one photo-conductive material, and
wherein the at least one light source is configured to emit light to the at least one photo-conductive material to cause the at least one photo-conductive material to be electrically conductive such that the electrical conductivity of the at least one photo-conductive material electrically connects the at least two segmented antenna apparatuses with each other.

2. The electronic device of claim 1, wherein, upon determining that it is necessary to change an antenna length according to a communication situation, the at least one processor is configured to change an electrical state of the at least one photo-conductive material by controlling the at least one light source.

3. The electronic device of claim 1,
wherein the printed circuit board further includes a grip sensor, and
wherein the at least one processor is configured to obtain grip information about a user's grip on the electronic device by use of the grip sensor.

4. The electronic device of claim 3, wherein the at least one processor is further configured to:
select some of the at least one light source based on at least the grip information, and
turn on the selected light source.

5. The electronic device of claim 4, wherein the at least one processor is further configured to:
identify a grip position of the user's grip based on at least the grip information, and
select a light source separated by a preset distance or more from the grip position.

6. The electronic device of claim 1, wherein the at least one photo-conductive material is coupled with an insulation material on a surface facing an outside of the electronic device.

7. The electronic device of claim 1, wherein the segmented antenna apparatuses include a conductive material.

8. An electronic device comprising:
a light emitting element;
an antenna structure including a first conductive member having a first antenna length, a second conductive member having a second antenna length, and a photo-conductive member disposed between the first conductive member and the second conductive member to connect the first conductive member and the second conductive member, and configured to constitute at least a portion of an outer surface of the electronic device;
a communication circuit electrically connected to the first conductive member and the second conductive member; and
at least one processor,
wherein the at least one processor is configured to:
communicate, while light is not output from the light emitting element, with an external electronic device via the communication circuit through a first frequency band corresponding to the first antenna length or a second frequency band corresponding to the second antenna length,
control the light emitting element to emit light to the photo-conductive member to cause the photo-conductive member to be electrically conductive and electrically connect the first conductive member with the second conductive member, and
communicate, when the first conductive member and the second conductive member are electrically connected to each other through the photo-conductive member irradiated by light so as to have a third antenna length while light is output from the light emitting element, with an external electronic device via the communication circuit through a third frequency band corresponding to the third antenna length.

9. The electronic device of claim 8, wherein, upon determining that it is necessary to change an antenna length according to a communication situation, the at least one processor is further configured to control the light emitting element to change an electrical state of the photo-conductive member to cause the photo-conductive member to be one of electrically conducting or electrically insulating.

10. The electronic device of claim 8, further comprising a grip sensor,
wherein the grip sensor is configured to obtain grip information about a grip position of a user's grip on the electronic device.

11. The electronic device of claim 10, wherein the at least one processor is further configured to control the light emitting element based on the grip information.

12. The electronic device of claim 8, wherein the photo-conductive member is coupled with an insulation material on a surface facing an outside of the electronic device.

13. An electronic device comprising:
a light emitting element;
a first conductive member having a first antenna length;
a second conductive member having a second antenna length;
a photo-conductive member disposed between the first conductive member and the second conductive member to connect the first conductive member and the second conductive member; and
a control circuit,
wherein the control circuit is configured to:
control the light emitting element to emit light to the photo-conductive member to cause the photo-conductive member to be electrically conductive such that the electrical conductivity of the photo-conductive member electrically connects the first conductive member with the second conductive member through the photo-conductive member irradiated by light so as to have a third antenna length.

14. The electronic device of claim 13, wherein, upon determining that it is necessary to change an antenna length according to a communication situation, the control circuit is further configured to control the light emitting element to change an electrical state of the photo-conductive member to cause the photo-conductive member to be one of electrically conducting or electrically insulating.

15. The electronic device of claim 13, further comprising:
a grip sensor,
wherein the grip sensor is used to obtain grip information about a grip position of a user's grip on the electronic device.

16. The electronic device of claim 15, wherein the control circuit is further configured to control the light emitting element based on the grip information.

17. The electronic device of claim 13, wherein the photo-conductive member is coupled with an insulation material on a surface facing an outside of the electronic device.

18. The electronic device of claim 13, wherein at least a first portion of the first conductive member and at least a first portion of the second conductive member are connected to the photo-conductive member.

19. The electronic device of claim 18, further comprising a board,
wherein the first conductive member, the second conductive member, and the photo-conductive member are disposed on the board, and
wherein at least a second portion of the first conductive member and at least a second portion of the second conductive member protrude to couple the first conductive member and the second conductive member to the board.

20. An antenna apparatus comprising:
a light emitting element;
a first conductive member having a first antenna length;
a second conductive member having a second antenna length; and
a photo-conductive member disposed between the first conductive member and the second conductive member to connect the first conductive member and the second conductive member,
wherein the light emitting element is configured to emit light to the photo-conductive member to cause the photo-conductive member to be electrically conductive such that the electrical conductivity of the photo-conductive member electrically connects the first conductive member with the second conductive member so as to have a third antenna length.

* * * * *